I. E. McCRACKEN.
BUMPER.
APPLICATION FILED DEC. 31, 1921.
1,413,283.
Patented Apr. 18, 1922.
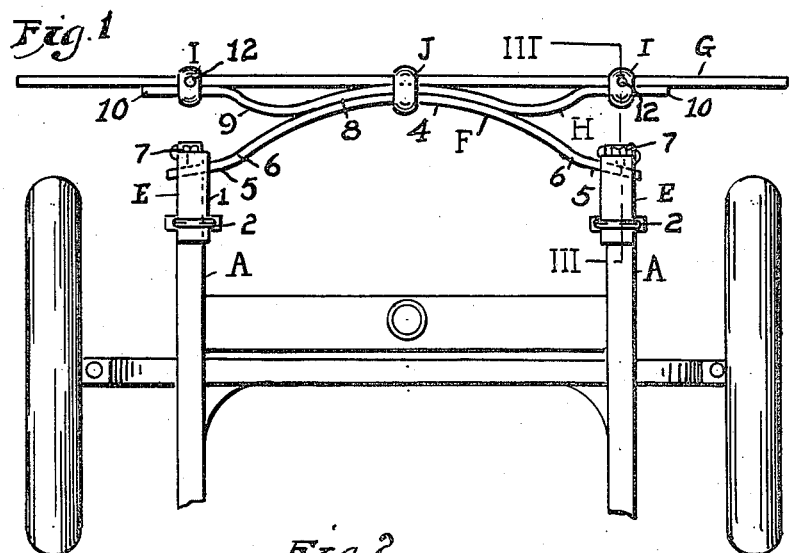
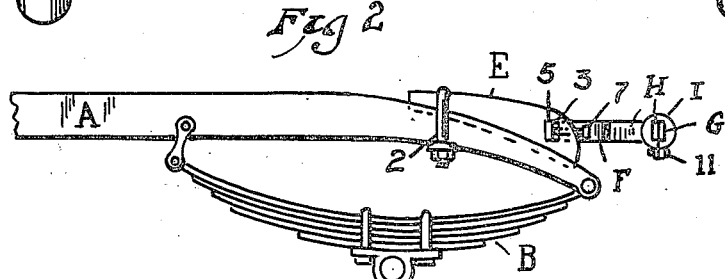
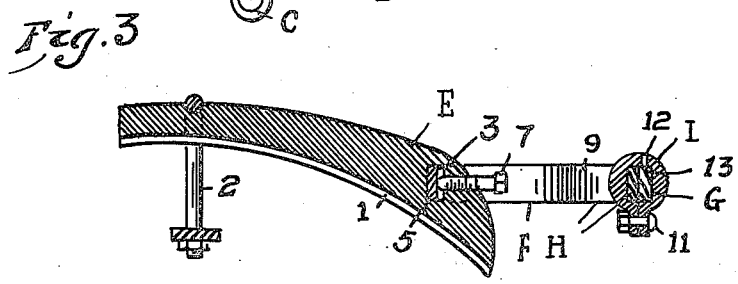
WITNESS
INVENTOR
Isaac E. McCracken,
by Edward A. Laurence.
his attorney.

UNITED STATES PATENT OFFICE.

ISAAC E. McCRACKEN, OF PITTSBURGH, PENNSYLVANIA.

BUMPER.

1,413,283.  Specification of Letters Patent.  Patented Apr. 18, 1922.

Application filed December 31, 1921. Serial No. 526,172.

*To all whom it may concern:*

Be it known that I, ISAAC E. MCCRACKEN, a citizen of the United States, and residing in the city of Pittsburgh, in the county of Allegheny and State of Pennsylvania, have invented or discovered a new, useful, and Improved Bumper, of which the following is a specification.

My invention consists in a new and improved bumper for motor vehicles.

The principle upon which the devices for this purpose now in use are constructed is the cushioning of the impact of collision either by the use of a more or less rigid member spring supported from the vehicle or by means of members of which are in themselves shock-absorbing owing to their resiliency. In either case a certain percentage of the force of impact is assumed by the vehicle itself.

My new and improved bumper is constructed on a different principle than the above, in that the force of impact is dissipated rather than absorbed, although there is a certain amount of shock absorption owing to the flexing of resilient members which makes possible the dissipation of the force of impact which is the prime object in view.

This dissipation is accomplished by transferring the shock to a bowed or convex resilient member in such a manner that the force is expended in flexing or straightening out the said member whose end portions are slidably mounted on the vehicle in a plane or planes transverse to the axis of the latter. Thus the force of impact is converted into movement within the structure of the bumper and said movement is relative to but not imparted to the vehicle, except in such instances where a very excessive shock cannot be fully assumed by the said movement assisted by the resiliency of the bumper. However, even in such cases, the portion of the shock finally imparted to the vehicle is a very small fraction of the original force of impact; very much less than in the case of the bumpers constructed on the cushioning principle.

Novel features of construction and arrangement of parts will appear from the following description.

In the accompanying drawings, which are, however, merely intended to illustrate a practical embodiment of the principles of my invention without limiting the scope of the same to the construction shown, Fig. 1 is a view in plan showing a bumper embodying the principles of my invention mounted on the front of a motor vehicle chassis, Fig. 2 is a side view of the same, the wheel being omitted to better show parts, and Fig. 3 is an enlarged detail showing the mounting of one end of the bumper in one of the bearing blocks, the parts being in section along the line III—III in Fig. 1.

The following is a detailed description of the drawings.

A represents the side beams of the chassis frame, to which are attached the front ends of the springs B which are secured intermediate of their ends to the axle C, with their rear ends shackled in the usual manner to the frame.

E represents the slide bearing blocks which are mounted on the beams A, having their bottom faces properly curved to fit the same. The inner sides of said blocks are provided with depending guard flanges 1 which prevent the blocks from being displaced by an outward thrust. The blocks are clamped rigidly in place by means of the U-bolts 2.

Each of said blocks is provided with a transverse slot or bearing 3 preferably inclined outwardly and rearwardly, as indicated, to receive the end portions of the dissipating member F.

The member F is a bar of resilient steel, having preferably a rectangular cross section having an outward, and in the drawings a forwardly, convexed central portion 4, and straight end portions 5, preferably slightly inclined toward the rear and which latter engage the bearing slots 3. 6 represents shoulders between the portions 4 and the portions 5 which by contacting with the inner ends of the slots 3 limit the outward movement of said end in said slot. 7 represents set bolts extending through threaded holes in the ends of the blocks E and impinging against ends of the bar F to keep the same from rattling in the blocks.

G is the impact member, in the form of a steel bar, preferably at least slightly resilient and of proper length to extend to the outside of the wheels when in the position shown in Fig. 1. The bar G is preferably of rectangular cross section.

Interposed between the members F and G is the distributing member H, a resilient steel bar, preferably of rectangular cross section. The central portion 8 of the bar H is curved to nest on the central portion of the bar F, and at either side the bar H is curved outwardly or forwardly as at 9, while the straight extremities 10 of the bar H lie flat against the rear face of the bar G.

The extremities of the bar H are held flat against the bar G by means of the split clamps I provided with clamping bolts 11 and internal depending dowel projections 12 which engage sockets 13 in the top of the bar G, so that the clamps are fixed on the bar G but the ends of the bar H are slidable in said clamps, thus permitting the bar H to flex.

At their centers the bars F, G, and H are connected by the clamp J, similar to the clamps I but unprovided with dowels.

It is quite evident that an impact at the center of the bar G would result in flexing the bar F, forcing its ends to slide outwardly in the bearing slots 3, thus resulting in the absorption and dissipation of the shock by the bar F without an appreciable shock or jar to the vehicle because the force is dissipated in spreading apart the extremities of the bar F. In case the impact on the bar G is at either side of the center, the distributing bar H will itself assume part of the impact and transfer the remainder of the same to the central portion of the bar F which will result in the dissipation of the force in causing the ends of the bar F to spread apart and slide in their bearings.

There is a decided advantage in inclining the extremities of the bar F and their bearing slots outwardly toward the rear, as this facilitates the movement of the ends of the bar in their bearings.

In case of a very excessive force of impact, such as a head on collision at very high speed, the bar F will flex sufficiently to bring the shoulders 6 into contact with the blocks E, thus limiting the movement of the ends of the said bar, and thereby causing the undissipated remainder of the force of impact to be transferred to the vehicle, but not as a shock applied axially to the vehicle but as thrusts working transversely of the vehicle and in such a manner as to work no damage.

It is thus evident that the chassis of the vehicle is protected from shock and jar in case of collision, as it would not be were the bumper relied upon merely to cushion or reduce the impact, the action of my improved bumper being to dissipate the forces, not merely to cushion the same.

What I desire to claim is—

1. In a vehicle bumper for the purpose described, the combination of an impact receiving bar, and an impact dissipating member comprising a resilient bar having a convex intermediate portion to which the force of the impact is transferred from said first named bar and the ends of the second named bar being mounted on the vehicle to slide transversely to the axis of the latter whereby the force of the impact is dissipated by the flexing of said second named bar.

2. In a vehicle bumper for the purpose described, the combination of an impact receiving bar, an impact dissipating member comprising a resilient bar having a convex intermediate portion and the ends of said second named bar being mounted on said vehicle to slide transversely to the axis of the latter whereby the flexing of the intermediate portion of said second named bar is translated into movement of the ends of the latter, and a resilient distributing bar interposed between said first named bar and the intermediate portion of said second named bar whereby an impact on any portion of the length of said first named bar is transferred to the intermediate portion of the second named bar.

3. In a vehicle bumper, the combination of an impact receiving bar, an impact dissipating member consisting of a resilient bar having a convex intermediate portion and having its ends mounted on the vehicle to slide transversely to the axis of the latter, and an impact distributing bar interposed between said first and second named bars, said third named bar having its intermediate portion curved to fit the convexed portion of said second named bar and having its end portions slidably connected to said first named bar.

4. In a vehicle bumper, the combination of an impact receiving bar, an impact dissipating member consisting of a resilient bar having a convex intermediate portion and having its ends mounted on the vehicle to slide transversely to the axis of the latter whereby the flexing of the intermediate portion of said second named bar is translated into movement of the ends of the latter, and a resilient distributing bar interposed between the first named bar and the intermediate portion of the second named bar, said third named bar having its intermediate portion curved to fit the convex intermediate portion of the second named bar and the ends of said third named bar being parallel with and slidably connected to said first named bar.

Signed at Pittsburgh, Pa., this 30th day of December, 1921.

ISAAC E. McCRACKEN.